United States Patent
Pacitto, Jr. et al.

(10) Patent No.: US 7,048,019 B2
(45) Date of Patent: May 23, 2006

(54) FUEL FILLER TUBE ASSEMBLY AND MANUFACTURING METHOD

(75) Inventors: Angelo Pacitto, Jr., Macomb, MI (US); Marvin F. Smith, Emmett, MI (US)

(73) Assignee: Shelby Enterprises, Inc., Romeo, MI (US)

( * ) Notice: Subject to any disclaimer, the term of this patent is extended or adjusted under 35 U.S.C. 154(b) by 0 days.

(21) Appl. No.: 10/675,210

(22) Filed: Sep. 30, 2003

(65) Prior Publication Data

US 2005/0067050 A1    Mar. 31, 2005

(51) Int. Cl.
B65B 1/09 (2006.01)
(52) U.S. Cl. .................. 141/286; 141/59; 141/350
(58) Field of Classification Search ............. 141/46, 141/59, 285, 286, 301, 349, 350; 220/86.2; 72/276, 347, 370, 467, 468
See application file for complete search history.

(56) References Cited

U.S. PATENT DOCUMENTS

| | | | |
|---|---|---|---|
| 2,319,567 A | 5/1943 | Vegell |
| 2,336,430 A | 12/1943 | Wery |
| 3,044,270 A | 7/1962 | Biever |
| 3,180,376 A | 4/1965 | Sanborn |
| 3,187,936 A | 6/1965 | Downing |
| 3,602,030 A | 8/1971 | Nado et al. |
| 3,979,010 A | 9/1976 | Fiedler et al. |
| 4,034,784 A | 7/1977 | Ball et al. |
| 4,195,673 A | 4/1980 | Johnston et al. |
| 4,204,563 A | 5/1980 | Pyle |
| 4,234,098 A | 11/1980 | Miller et al. |
| 4,386,514 A | 6/1983 | Herten |
| 4,450,880 A | 5/1984 | Scheurenbrand |
| 4,462,620 A | 7/1984 | Bambenek et al. |
| 4,632,270 A | 12/1986 | Sasaki et al. |
| 4,635,813 A | 1/1987 | Peickert |
| 4,782,974 A | 11/1988 | Elkayam |
| 5,056,570 A | 10/1991 | Harris et al. |
| 5,271,438 A | 12/1993 | Griffin et al. |

(Continued)

FOREIGN PATENT DOCUMENTS

DE    24 52 248    5/1975

(Continued)

OTHER PUBLICATIONS

Carbon steel tubes for machine structural purposes; Japanese Industrial Standard; JIS G 3445: 2004.

(Continued)

*Primary Examiner*—David J. Walczak
*Assistant Examiner*—Peter deVore
(74) *Attorney, Agent, or Firm*—Harness, Dickey & Pierce, P.L.C.

(57) ABSTRACT

A method of forming a filler tube includes forming a funnel insert, forming a funnel portion in a first end of a filler tube, and joining the funnel insert and the funnel portion of the filler tube. The funnel portion includes a transition portion configured to induce a swirl to passing fuel for venting vapors from the gas tank during fuel filling. A fuel filler tube assembly includes the funnel portion including a tubular body defining a larger inlet and a smaller outlet, the position of the inlet relative the outlet and an internal configuration of the tubular body therebetween inducing a swirl to inventing vapors from fuel flowing through the tubular body. The larger inlet receives a funnel insert including a nozzle opening positioned to cooperate with the internal configuration of the tubular body.

55 Claims, 4 Drawing Sheets

U.S. PATENT DOCUMENTS

| | | | |
|---|---|---|---|
| 5,309,961 A | 5/1994 | Franke et al. | |
| 5,360,040 A | 11/1994 | Thorn et al. | |
| 5,385,179 A | 1/1995 | Bates et al. | |
| 5,415,316 A | 5/1995 | Pemberton et al. | |
| 5,507,324 A | 4/1996 | Whitley, II et al. | |
| 5,590,806 A | 1/1997 | Green et al. | |
| 5,673,738 A | 10/1997 | Spaulding | |
| D392,020 S | 3/1998 | Fairles | |
| 5,735,322 A | 4/1998 | Palvolgyi | |
| 5,791,387 A | 8/1998 | Palvolgyi | |
| 5,860,460 A | 1/1999 | Hidano et al. | |
| 6,289,945 B1 | 9/2001 | Haboush, II | |
| 6,330,893 B1 * | 12/2001 | O'Connell | 141/46 |
| 6,336,482 B1 | 1/2002 | Cunkle et al. | |
| 6,405,767 B1 | 6/2002 | Marsala et al. | |
| 6,523,582 B1 | 2/2003 | Furuta | |
| 6,585,015 B1 | 7/2003 | Hughes | |
| 6,588,459 B1 * | 7/2003 | O'Connell | 141/46 |
| 2003/0089424 A1 | 5/2003 | Gabbey et al. | |

FOREIGN PATENT DOCUMENTS

| | | |
|---|---|---|
| JP | 58-194627 | 11/1983 |
| JP | 60-156964 | 8/1985 |
| JP | 61-125827 | 8/1986 |
| JP | 10-119595 | 5/1998 |

OTHER PUBLICATIONS

Carbon steel tubes for machine structural purposes; Japanese Industrial Standard; JIS G 3445: 1988.

* cited by examiner

FUEL FILLER TUBE ASSEMBLY AND MANUFACTURING METHOD

FIELD OF THE INVENTION

The present invention relates to a fuel tank system for an automobile and, in particular, to an improved filler tube assembly.

BACKGROUND OF THE INVENTION

Reducing gasoline vapor loss in fuel tank systems is becoming increasingly important in the automobile industry. A solution to this problem has been to reduce the diameter of an outlet end of a fuel tank filler neck relative an inlet end. While this approach has achieved some success, the success has been limited because as the diameter of the filler neck is decreased, the resistance to gasoline flow is increased. This increased resistance has caused other problems, notably pressure build up in the filler neck, often causing the fuel nozzle to shut off before the fuel tank is full.

Permeability of materials from which the filler tube assembly is manufactured also presents another design issue because the fuel vapors may diffuse through the fuel tank system components; various types of mild steels, for example, permit fuel vapor diffusion. Such fuel vapor diffusion further increases as steel components corrode over time.

A manufacturing issue with current filler neck designs is the method by which the diameter of inlet and of the filler neck is increased relative the diameter of the outlet end in order to provide a sufficient diameter to accept a gas nozzle during refueling. While filler necks are often made by a process of repeated reductions and expansions of a seamed, welded tube, this mechanical process structurally weakens the tube, resulting in an increasing tendency for the tube to leak at the seam.

To address this issue, manufacturers have begun using a seamless tube, which addresses the seam-leak problem but requires mechanically joining the outlet end of the filler neck to a separate filler tube and coupling a nozzle retainer. Such prior art attempts will include U.S. patent application Ser. No. 09/454,103, now U.S. Pat. No. 6,330,893; U.S. patent application Ser. No. 09/998,113, now U.S. Pat. No. 6,588,459; and U.S. patent application Ser. No. 10/615,485, filed Jul. 8, 2003; each of which is incorporated herein by reference. While these designs are improvements, such a three-piece fuel filler tube assembly is relatively expensive to manufacture and assemble and necessarily requires mechanical joints between the filler neck and filler tube, as well as between the nozzle retainer and the filler neck. Any joint in a fuel filler tube assembly creates the possibility for vapor loss or fuel leaks through a defect or corrosion.

Moreover, with the necessity to assemble the parts post-manufacturing of the individual parts, variability in part dimensions—for example, the joints between the filler neck outlet and the filler tube and between the nozzle retainer and filler neck—as well as the quality of any sealing surfaces, can lead to an inferior product. Similarly, inconsistency in the orientation of features of the filler tube assembly, for example, thread orientation relative a fuel cap sealing surface or nozzle retainer orientation relative filler tube features, can lead to defective fuel filler tube assemblies through mistakes in the assembly process.

SUMMARY OF THE INVENTION

A method of forming a filler tube assembly includes forming a funnel insert, forming a funnel portion at a first end of a filler tube, and joining the funnel insert in the funnel portion of the filler tube. The funnel portion is configured to include a transition portion for inducing a swirl to passing fuel, whereby vapors may be vented from the gas tank during fuel filling. The configuration includes forming an inlet at one end of the funnel portion and forming an outlet at the opposite end of the funnel portion. An axis of the inlet is offset from the axis of the outlet.

The method may further include forming a sealing surface above the inlet opening to the funnel insert, perhaps by rolling over an edge defining the inlet opening. The funnel insert may further include threads formed integrally therein, the threads adapted to engage a fuel cap for sealing the fuel tank system from the environment.

The filler tube is preferably formed by cutting a length of tube stock to form the filler tube. The funnel insert preferably includes an integrally formed nozzle receptor.

An end of the filler tube opposite the funnel insert may be joined to a fuel tank. Further, opposite ends of a vent tube may be joined to the funnel portion of the filler tube and the fuel tank, respectively, in order to provide ventilation for the fuel tank system.

A fuel filler tube assembly according to the invention includes a funnel portion of a filler tube including a tubular body defined in a larger inlet and a smaller outlet, the position of the inlet relative the outlet and an internal configuration of the tubular body between the inlet and the outlet inducing a swirl to inventing vapors from fuel flowing through the tubular body. The larger inlet receives a funnel insert including a nozzle opening position to cooperate with the internal configuration of the tubular body. The internal configuration of the tubular body includes a tapered section of the tubular body having an elliptically shaped junction between a first portion of the tubular body including the inlet end and a second portion of the tubular body including the outlet. The elliptically shaped junction lies on a plane inclined to be angled to an axis of at least one of the inlet and the outlet. The filler tube and the funnel insert are preferably formed from a seamless tube.

The filler tube assembly may include a sealing surface formed integrally about an inlet opening of the funnel insert. The funnel insert may further include integrally formed threads for receiving the fuel cap.

The filler tube assembly may include a vent tube connected to the filler tube. Further, the vent tube may be connected to a fuel tank that is also connected to the filler tube.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
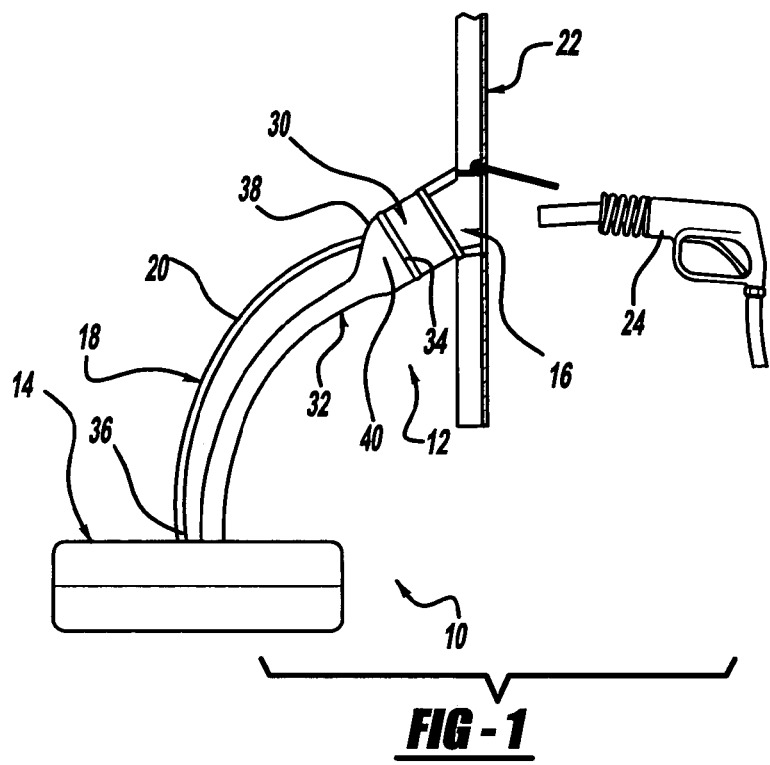
FIG. 1 is a schematic view of a fuel tank system according to the invention.
Figure 2:
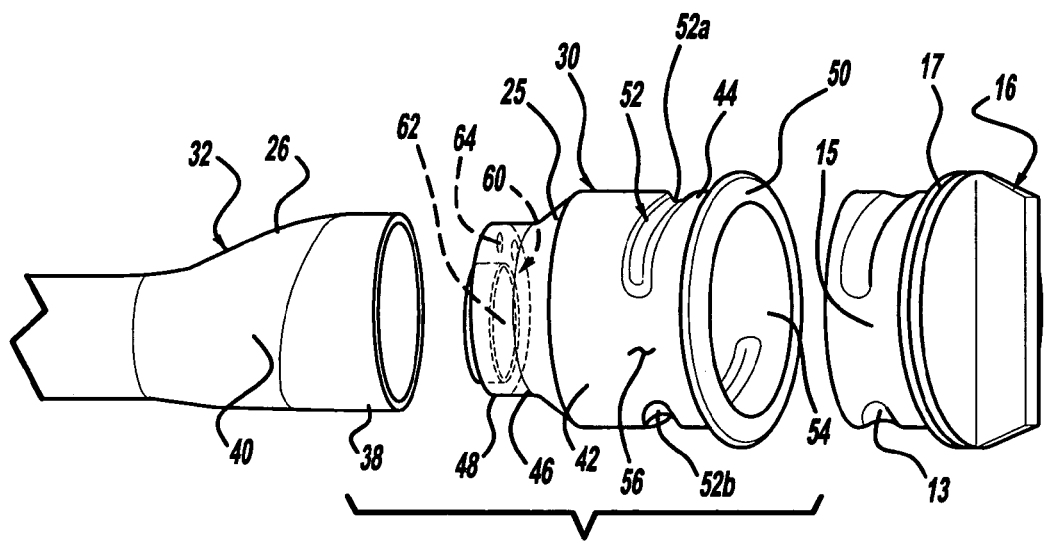
FIG. 2 is an exploded perspective view of the filler tube assembly according to the invention.

With reference to FIGS. 1 and 2, a fuel tank system 10 generally includes a filler tube assembly 12, a fuel tank 14, and a fuel cap 16. The fuel tank system 10, which is supported by an automobile body 22, may further include a ventilation system 18, which is illustrated generally as a vent tube 20 extending between the filler tube assembly 12 and the fuel tank 14.

The filler tube assembly 12 generally includes a funnel insert 30 and a filler tube 32 joined together at a joint 34, which may be brazed, welded, adhered or otherwise mechanically or chemically joined. The two-piece assembly of the funnel insert 30 and the filler tube 32 provides a fueling path from a fuel supply source, such as a fuel nozzle 24, located exterior the automobile body 22 to the fuel tank 14 within the automobile body 22.

The filler tube 32 is a one-piece seamless tube extending between the fuel tank 14 and the funnel insert 30 in order to communicate fuel flow from the funnel insert 30 to the fuel tank 14. The filler tube 32, at a first end 36, is coupled to the fuel tank 14. At a second end 38, the filler tube 32 includes a funnel portion 40, which is a flared portion of the filler tube 32 including the second end 38 and a transition portion 26. The transition portion 26 provides a tapered configuration designed to cause fuel flowing therethrough to swirl. The funnel portion 40 of the second end 38 includes an axis offset axially from the axis of the first end 36 due to a generally elliptically shaped cross-section of the transition portion 26.

As shown in FIGS. 1 and 2, the funnel insert 30 is a one-piece seamless tube having a first diameter portion 42 at an inlet end 44, a second diameter portion 46 at an insert end 48, and an integrally formed nozzle retainer 60. The first diameter portion 42 is larger than the second diameter portion 46 and is designed to receive the fuel cap 16, which includes a sealing ring 17 and a stem 15 including threads 13, and a conical portion 25 which joins the first and second diameter portions 42, 46.

Figure 3:
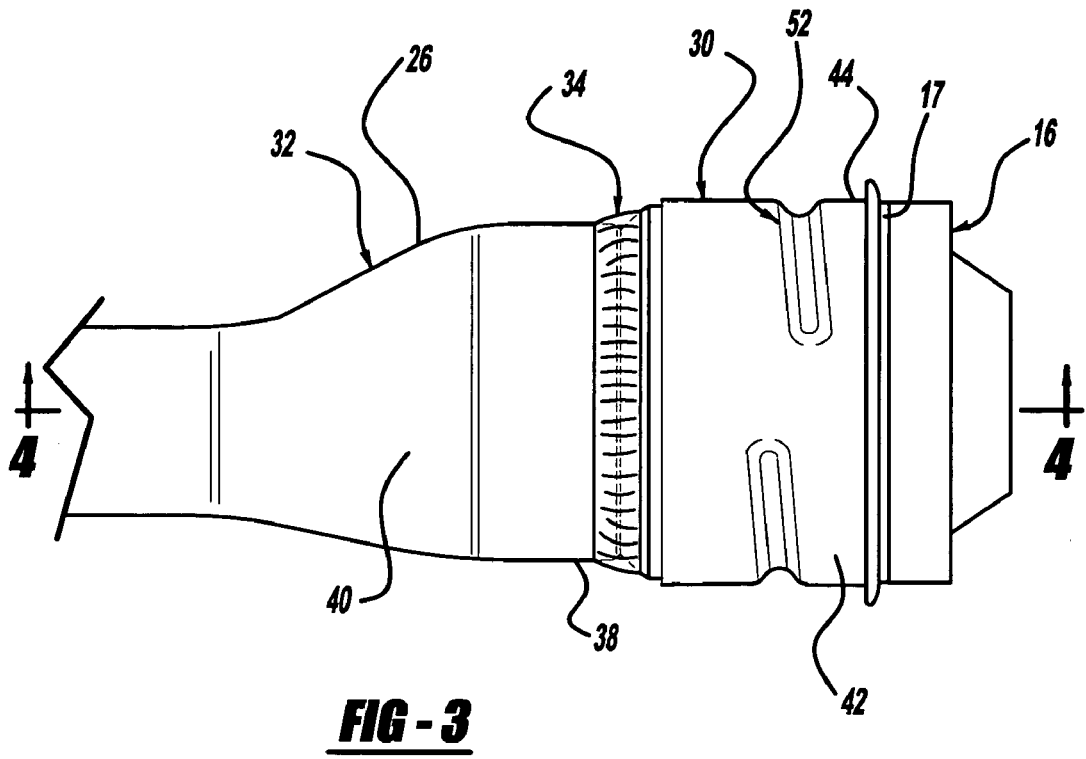
FIG. 3 is a partial side view of a filler tube assembly according to the invention.

The first diameter portion 42 of the funnel insert 30 includes a sealing surface 50 and threads 52, both of which are integrally formed when manufacturing the funnel insert 30. The sealing surface 50 will be a generally planar radial extension formed about a circumference of an inlet opening 54 formed in the inlet end 44 of the funnel insert 30. With reference to FIG. 3, the sealing surface 50 provided about the inlet end 44 of the first diameter portion 42 of the funnel insert 30 provides a sealing surface against which the fuel cap 16 seals when threaded into threads 52. The sealing ring 17 may be positioned between the fuel cap 16 and the sealing surface 50.

Figure 4:
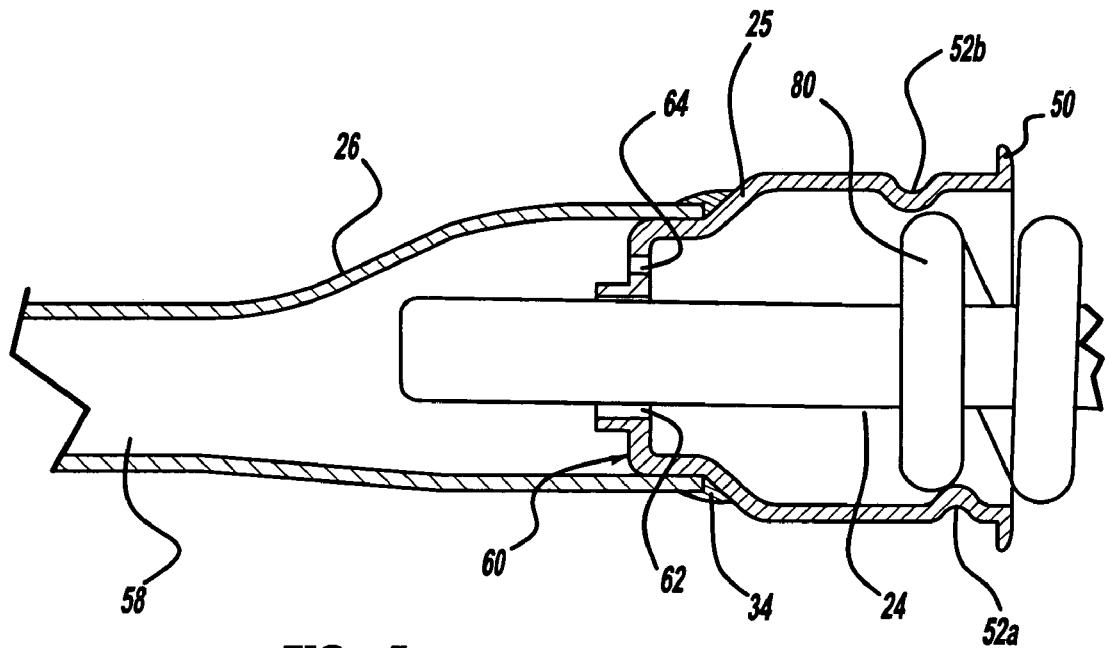
FIG. 4 is a sectioned side view of the filler tube assembly according to the invention.

The threads 52, which include thread segment 52a and thread segment 52b, are formed in a sidewall 56 of the first diameter portion 42. The threads 52 are inner diameter threads extending radially into the first diameter portion 42 and mate with the threads 15 formed radially inwardly in the stem 13. Further, the threads 52 further function to hook or retain the fuel nozzle 24 during fueling through engagement with rings 80 of the fuel nozzle 24, as shown in FIG. 4. Note that the threads 52 may be screw, quarter-turn, eighth-turn, or quick-turn thread configurations, as well as other known thread configurations.

The nozzle retainer 60 is formed at the insert end 48 of the second diameter portion 46 and includes a nozzle opening 62 and vent holes 64. Further, the nozzle opening 62 also axially offset in a radial direction opposite the transition portion 26 of the filler tube 32 in order to direct fuel supplied by the fuel nozzle 24, which when inserted is disposed toward the transition portion 26, whereby a swirl motion may be induced to the flowing fuel. The nozzle opening 62 further includes a cylindrical wall 63 surrounding the nozzle opening 62 and extending in the insert direction. The nozzle retainer 60 is positioned relative the threads 52 in order that the nozzle opening 62 is axially offset in a radial direction laterally aligned with one of the thread portions 52a, 52b. As shown on FIG. 4, the threads 52 and nozzle opening 62, through their relative positions and generally offset orientation relative the filler tube assembly 12, retain the fuel nozzle 24 in a proper fuel-filling orientation.

Figure 5:
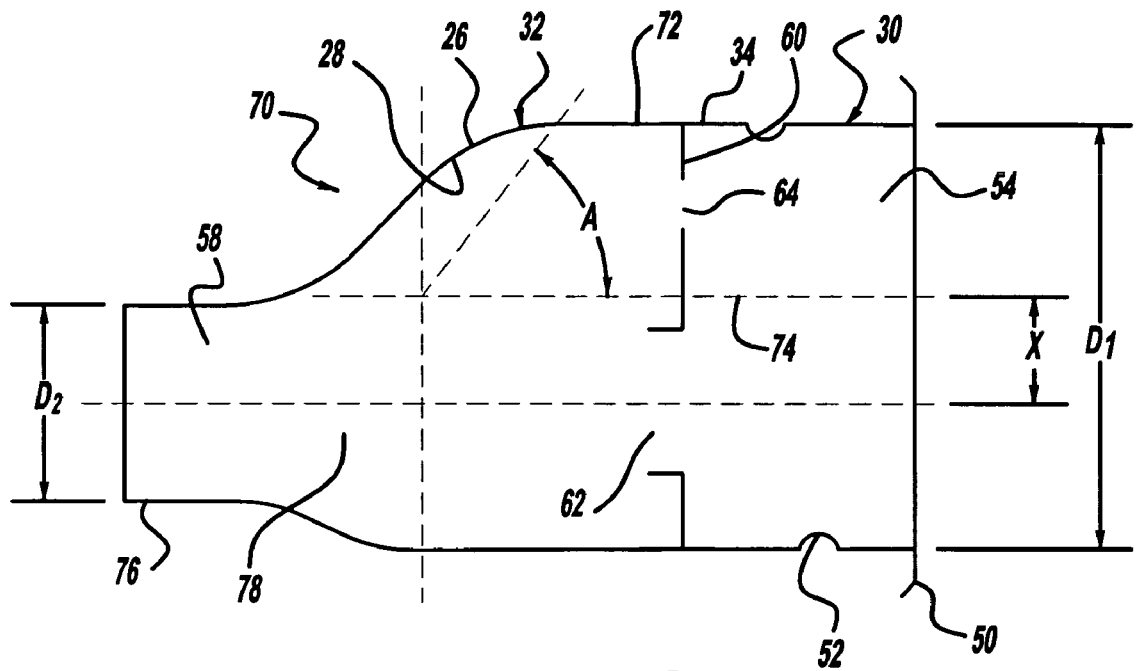
FIG. 5 is a schematic illustration of the filler tube assembly according to the invention.
Figure 6:
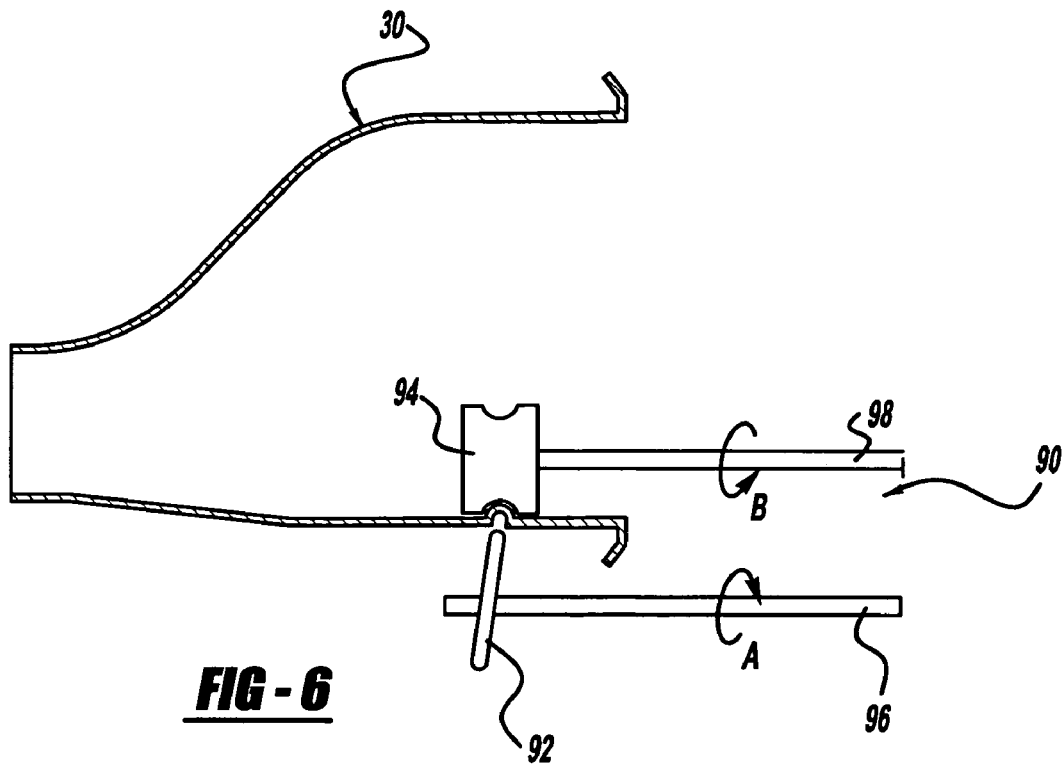
FIG. 6 is a schematic illustration of a method of forming threads in the filler tube assembly.

The funnel insert 30 and filler tube 32 are assembled and joined at the joint 34, such as by a braze, weld, adhesive or other mechanical or chemical joint. The assembled filler tube assembly 12, with the insert end 48 of the second diameter portion 46 inserted into the funnel portion 40 of the filler tube 32 creates a funnel member 70 having integrally formed therein the sealing surface 50, the threads 52, and the nozzle retainer 60, as shown in FIG. 5. Overall, the configuration of the funnel member 70, formed by the funnel insert 30 and the funnel portion 40 of the filler tube 32, provides an arrangement that induces a swirling motion to the fuel as the fuel flows toward the filler tube 32 and fills the fuel tank 14 depending on the type of fuel nozzle used. The offset axial relationship of the inlet opening 54 and outlet opening 58 causes supplied fuel to impinge a sidewall 28 (coincident with the transition portion 26 of the filler tube 32) of the funnel member 70, whereby fuel spirals as it flows through the filler tube 32. The swirling motion of the fuel created by the funnel member 70 causes a suctioning effect or liquid seal that prevents fuel vapors from escaping into the atmosphere during refueling. The swirling motion of the fuel also creates a central void that allows any pressure buildup created during the fueling to vent, thereby preventing premature shutoff of the fuel nozzle 24.

The funnel member 70 includes a relatively larger diameter section 72 forming the inlet opening 54, which is arranged about an axis 74 and spaced-apart axially offset from a relatively smaller diameter tubular section 76 arranged about an axis 78 forming the outlet opening 58. As shown, axes 74 and 78 are parallel, but can be positioned divergently.

The larger diameter section 54 and the smaller diameter section 58 are connected to one another by the transition portion 26, which generally tapers from the larger diameter section 54 to the smaller diameter section 58. The transition portion 26 intersects larger diameter section 72 at an elliptically-shaped junction that lies in a plane inclined at angle A, which is 60°–85° from the axes 74, 78. By way of an example, the inlet opening 54 may have a diameter $D_1$ of approximately 60 millimeters and the tubular section might have a diameter $D_2$ of approximately 25 millimeters with a coaxial offset at a distance X of approximately 15 millimeters. The relationship of the inlet opening 54 and the outlet opening 58 and the configuration of the transition portion 26 causes the fuel to swirl during fueling.

The fuel filler tube assembly 12 may be made by a number of forming processes including eyelet/progressive stamping, eyelet stamping, progressive die stamping, transfer die stamping, and hydroforming. If the fuel tank filler neck is made of plastics, injection molding and compression molding are suitable methods for manufacturing the fuel filler tube assembly 12.

The fuel filler tube assembly 12 is manufactured by forming the funnel insert 30 and expanding the second end 38 of the filler tube 32 to create the funnel member 40. The insert end 48 of the funnel insert 32 is positioned within the second end 38 of the filler tube 32 in fluid communication with the funnel member 40. The joint 34 between the filler tube 32 and funnel insert 30 is formed to mechanically or chemically secure to one another. The assembled fuel filler tube assembly 12 is connected to the fuel tank 14 and the automobile body 22.

The funnel insert 30 is formed by stamping a one-piece seamless tube having the larger first diameter portion 42 defining the inlet end 44 and the smaller second diameter portion 46 defining the insert end 48 including the integrally formed nozzle retainer 60. The stamping method may be progressive stamping, wherein sheet stock is formed into a circular blank that is drawn into a cup shape. This drawing method may include several dies in which the funnel insert is progressively formed or deep drawn to shape the first diameter portion 42, the second diameter portion 46, and the transition portion 26 therebetween. The inlet opening 54 of the funnel insert 30 is defined by rolling over an edge of the inlet end 44 to define the sealing surface 50 about the inlet opening 54. The nozzle retainer 60 is defined by piercing the nozzle opening 62 and the vent holes 64 in a bottom surface or insert end 48 of the drawn cup shape.

The filler tube 32 is formed by cutting tube stock to a desired length. The end of the tube stock to receive the funnel insert 30 is flared to create the funnel portion 40 by expanding the diameter of the tube through an end-forming process. For example, a first punch having a first diameter is forced into the second end 38 of the filler tube 32. Because the diameter of the first punch is larger than the diameter of the second end 38, the insertion of the punch expands the diameter of the second end 38. If necessary, this process is repeated with a second punch having a diameter larger than the first punch to expand the second end 38 farther. This process may be repeated as necessary to expand the diameter of the second end 38 of the filler tube 24 to the desired diameter without severely stressing or weakening the tube. The filler tube 32 is also bent to accommodate the geometry of a particular automotive vehicle application.

Figure 7:
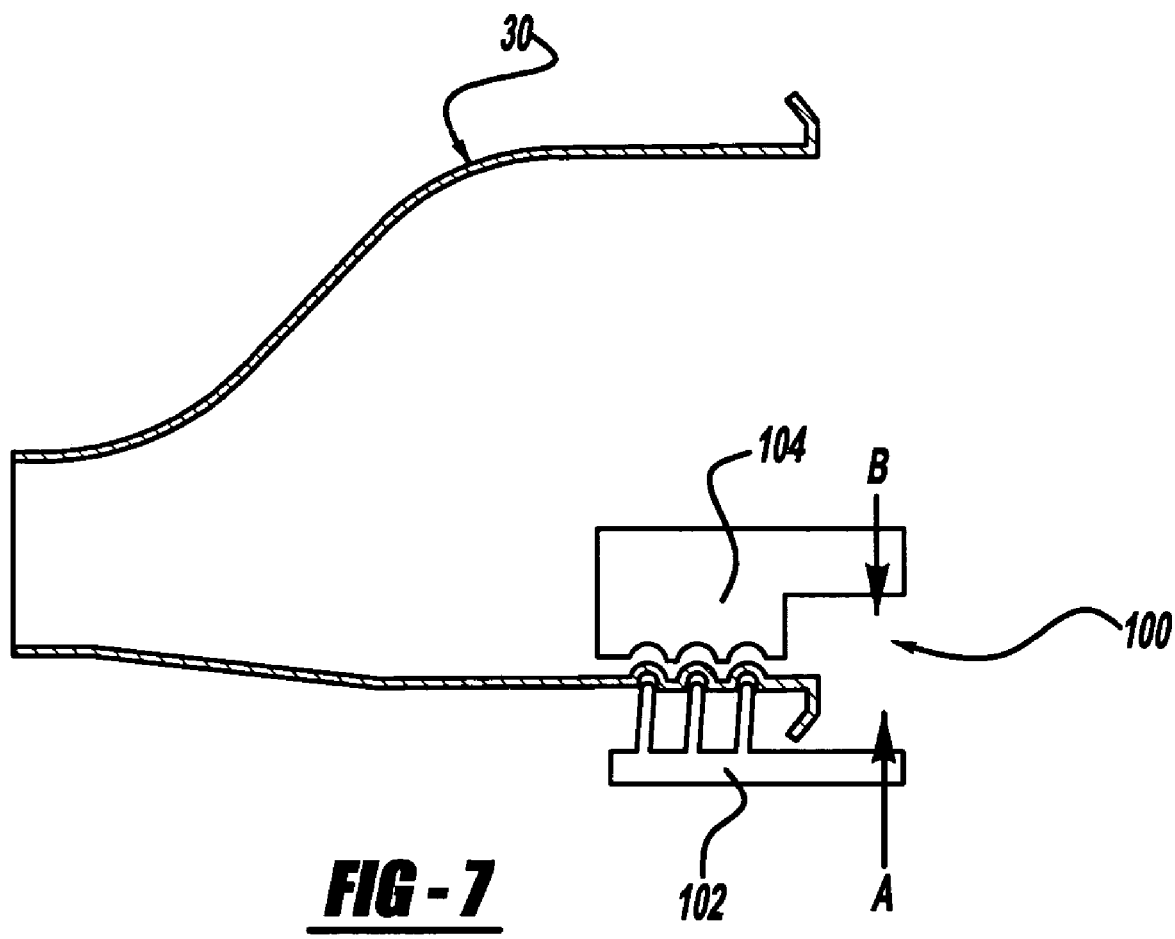
FIG. 7 is a schematic illustration of another method of forming threads in the filler tube assembly.

With reference to FIG. 7, the threads 52 may be formed in the funnel insert 30 by a forming tool 90 including wheels 92, 94, which in combination are of appropriate shape to form the threads 52 in the sidewall of the funnel insert 30. The wheels 92, 94, which are mounted on shafts 96, 98, spin in directions A, B as they press on the sidewall 38 to form the threads 36. This spinning allows forming tool 90 to form the periphery of the funnel insert 30 about the inlet opening 54.

With reference to FIG. 8, another method of forming threads 52 in the funnel insert 30 is provided. The threads 52 are made by a crimping tool 100, which includes crimping halves 102, 104. The sidewall is placed between crimping halves 102, 104, which are pressed together in directions A, B to form the threads 52. This process is repeated along the sidewall 38 until the threads 52 are completely formed in the funnel insert 30 about the inlet opening 54.

The funnel insert 30 and filler tube 32 are aligned and joined by the joint 34, which may be a weld, braze, adhesive, or some other mechanical or chemical joint. The integrity of the funnel insert 30, filler tube 32 and the joint 34 may be leak tested to verify the integrity of the components and their interconnection.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method comprising:
   forming a funnel insert with a first diameter portion larger than a second diameter portion;
   forming a filler tube including a funnel portion having a first diameter and a first axis and an elongated portion having a second diameter smaller than said first diameter and a second axis offset from said first axis;
   attaching said funnel portion of said filler tube to said second portion of said funnel insert; and
   configuring a transition portion of said funnel portion to induce a swirl to passing fuel for venting vapors from said fuel tank during fuel filling.

2. The method of claim 1, further comprising forming a sealing surface about an inlet opening to said funnel insert.

3. The method of claim 2, wherein said forming a sealing surface includes rolling over an edge defining the inlet opening.

4. The method of claim 1, further comprising cutting a length of tube stock to form said filler tube.

5. The method of claim 1, further comprising forming a nozzle receptor in said funnel insert.

6. The method of claim 1, further comprising joining opposite ends of a vent tube to said funnel portion and said fuel tank, respectively.

7. The method of claim 1, further comprising joining a vent tube to said funnel portion of said filler tube.

8. The method of claim 1, further comprising forming threads in said funnel insert.

9. A fuel filler tube assembly comprising:
   a funnel portion of a filler tube including a tubular body defining an inlet larger than an outlet, said inlet of said funnel portion having a first axis and receiving a funnel insert including a nozzle opening positioned to cooperate with an internal configuration of said tubular body between said inlet and said outlet to induce a swirl to vent vapors from fuel flowing through said tubular body, said outlet having a second axis offset from said first axis.

10. The fuel filler tube assembly of claim 9, wherein said outlet of said filler tube is attached to a fuel tank.

11. The fuel filler tube assembly of claim 9, further comprising a vent tube connected to said filler tube.

12. The fuel filler tube assembly of claim 11, wherein said vent tube also connects said filler tube and said fuel tank.

13. The fuel filler tube assembly of claim 9, wherein said internal configuration of said tubular body includes a tapered section of said tubular body.

14. The fuel filler tube assembly of claim 13, wherein said tapered section includes an elliptically shaped junction between a first portion of said tubular body including said inlet and a second portion of said tubular body including said outlet.

15. The fuel filler tube assembly of claim 14, wherein said elliptically-shaped junction lies on a plane inclined at an angle to an axis of at least one of said inlet and said outlet.

16. The fuel filler tube assembly of claim 14, wherein said inlet has a diameter $D_1$, said outlet has a diameter $D_2$, and $D_1$ is at least one and a half times $D_2$.

17. The fuel filler tube assembly of claim 9, wherein said filler tube is a seamless tube.

18. The fuel filler tube assembly of claim 9, wherein said funnel insert is a seamless tube.

19. The fuel filler tube assembly of claim 9, wherein said funnel insert includes integrally formed threads.

20. The fuel filler tube assembly of claim 9, further comprising a fuel cap selectively engaging said funnel insert.

21. The fuel filler tube assembly of claim 9, wherein said funnel insert includes a sealing surface operable to selectively engage said fuel cap.

22. The fuel filler tube assembly of claim 21, wherein said funnel insert includes a larger diameter portion having an inlet opening creating said sealing surface.

23. A method comprising:
drawing a funnel insert with a first diameter portion larger than a second diameter portion;
forming a funnel portion at an end of a filler tube, an opposite end of said filler tube being operable to be directly attached to a fuel tank;
forming a relatively large inlet at one end of said funnel portion, said inlet having a first axis;
forming a relatively small outlet at said opposite end of said funnel portion, said outlet having a second axis offset from said first axis;
joining said second diameter portion of said funnel insert and said funnel portion of said filler; and
configuring a transition of a tubular body between said inlet and outlet to induce a swirl to and vent vapors from fuel flowing through said funnel portion.

24. The method of claim 23, further comprising attaching said opposite end of said filler tube to a fuel tank.

25. The method of claim 23, further comprising forming threads in said first diameter portion of said funnel insert.

26. The method of claim 23, further comprising forming a sealing surface about said first diameter portion of said funnel insert.

27. The method of claim 26, wherein said forming a sealing surface includes rolling over an edge defining an inlet opening.

28. The method of claim 23, further comprising forming a nozzle receptor in said second diameter portion of said funnel insert.

29. The method of claim 23, further comprising cutting a length of tubing stock to form said filler tube.

30. The method of claim 23, further comprising joining an end of said filler tube opposite said funnel insert to said fuel tank.

31. The method of claim 30, further comprising joining opposite ends of a vent tube to said funnel portion and said fuel tank, respectively.

32. The method of claim 23, further comprising joining a vent tube to said funnel portion of said filler tube.

33. A fuel filler tube assembly comprising:
a filler tube including a tubular body defining an inlet larger than an outlet; and
a funnel insert including a first cylindrical section, a second cylindrical section, a third cylindrical section disposed between said first cylindrical section and said second cylindrical section, and a tapered surface extending between said first cylindrical section and said third cylindrical section, said first cylindrical section received in said inlet of said filler tube with said tapered surface engaging a surface of said inlet when said first cylindrical section is disposed within said inlet of said filler tube.

34. The fuel filler tube assembly of claim 33, wherein said funnel insert is a seamless tube.

35. The fuel filler tube assembly of claim 33, wherein said funnel insert includes integrally formed threads.

36. The fuel filler tube assembly of claim 33, further comprising a fuel cap selectively engaging said funnel insert.

37. The fuel filler tube assembly of claim 33, wherein said funnel insert includes a sealing surface formed about said second cylindrical section.

38. The fuel filler tube assembly of claim 37, wherein said second cylindrical section includes an inlet opening and a portion of said funnel insert defining said inlet opening creates a sealing surface.

39. A fuel filler tube assembly comprising:
a filler tube including a tubular body defining an inlet larger than an outlet; and
a funnel insert including a first section, a second section, and a tapered surface extending between said first section and said second section, said first section received by said inlet of said filler tube and including a nozzle retainer;
wherein said tapered surface engages a surface of said inlet when said first section is disposed within said inlet of said filler tube.

40. The fuel filler tube assembly of claim 39, wherein said funnel insert is a seamless tube.

41. The fuel filler tube assembly of claim 39, wherein said funnel insert includes integrally formed threads.

42. The fuel filler tube assembly of claim 39, further comprising a fuel cap selectively engaging said funnel insert.

43. The fuel filler tube assembly of claim 39, wherein said funnel insert includes a third section formed adjacent said second section.

44. The fuel filler tube assembly of claim 43, wherein a sealing surface is formed about said third section.

45. The fuel filler tube assembly of claim 44, wherein said third section includes an inlet opening and a portion of said funnel insert defining said inlet opening creates a sealing surface.

46. A method comprising:
drawing a funnel insert with a first diameter portion larger than a second diameter portion;
forming a funnel portion at an end of a filler tube, an opposite end of said filler tube being operable to be directly attached to a fuel tank;
forming a relatively large inlet at one end of said funnel portion, said inlet having a first axis;
forming a relatively small outlet at said opposite end of said funnel portion, said outlet having a second axis offset from said first axis;
joining said second diameter portion of said funnel insert and said funnel portion of said filler tube; and
forming a nozzle receptor in said second diameter portion of said funnel insert.

47. The method of claim 46, further comprising attaching said opposite end of said filler tube to a fuel tank.

48. The method of claim 46, further comprising configuring a transition of said tubular body between said inlet and outlet to induce a swirl to and vent vapors from fuel flowing through said funnel portion.

49. The method of claim 46, further comprising forming threads in said first diameter portion of said funnel insert.

50. The method of claim 46, further comprising forming a sealing surface about said first diameter portion of said funnel insert.

51. The method of claim 50, wherein said forming a mug surface includes rolling over an edge defining an inlet opening.

52. The method of claim 46, further comprising cutting a length of tubing stock to form said filler tube.

53. The method of claim 46, further comprising joining an end of said filler tube opposite said funnel inert to said fuel tank.

54. The method of claim 53, further comprising joining opposite ends of a vent tube to said funnel portion and said fuel tank, respectively.

55. The method of claim 46, further comprising joining a vent tube to said funnel portion of said filler tube.

* * * * *

UNITED STATES PATENT AND TRADEMARK OFFICE
CERTIFICATE OF CORRECTION

PATENT NO. : 7,048,019 B2  
APPLICATION NO. : 10/675210  
DATED : May 23, 2006  
INVENTOR(S) : Angelo Pacitto, Jr. and Marvin F. Smith Page 1 of 1

It is certified that error appears in the above-identified patent and that said Letters Patent is hereby corrected as shown below:

Col. 7, line 34, Claim 23  
Insert --tube-- after "filler"

Col. 9, line 10, Claim 51  
Delete "mug" and insert --sealing--

Col. 10, line 4, Claim 53  
Delete "inert" and insert --insert--

Signed and Sealed this

Thirtieth Day of January, 2007

JON W. DUDAS  
*Director of the United States Patent and Trademark Office*